US010938893B2

(12) United States Patent
Moss et al.

(10) Patent No.: US 10,938,893 B2
(45) Date of Patent: *Mar. 2, 2021

(54) SYSTEM FOR OPTIMIZING DISTRIBUTION OF PROCESSING AN AUTOMATED PROCESS

(71) Applicant: Blue Prism Limited, Warrington (GB)

(72) Inventors: David Moss, Warrington (GB); Stuart Wood, Warrington (GB)

(73) Assignee: BLUE PRISM LIMITED, Warrington (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/583,187

(22) Filed: Sep. 25, 2019

(65) Prior Publication Data
US 2020/0021645 A1    Jan. 16, 2020

Related U.S. Application Data

(63) Continuation of application No. 15/462,709, filed on Mar. 17, 2017, now Pat. No. 10,469,572.

(30) Foreign Application Priority Data

Feb. 15, 2017    (GB) ..................... 1702450

(51) Int. Cl.
    *G06F 15/173*     (2006.01)
    *H04L 29/08*     (2006.01)

(52) U.S. Cl.
    CPC ...... *H04L 67/1012* (2013.01); *H04L 67/1031* (2013.01)

(58) Field of Classification Search
None
See application file for complete search history.

(56) References Cited

U.S. PATENT DOCUMENTS

| 6,256,637 | B1 | 7/2001 | Venkatesh et al. |
| 7,962,620 | B2 | 6/2011 | Safari et al. |
| 7,971,091 | B1 | 6/2011 | Bingham et al. |
| 8,826,068 | B2 | 9/2014 | Somendra |

(Continued)

FOREIGN PATENT DOCUMENTS

| CN | 101430644 A | 5/2009 |
| JP | 2009-151467 A | 7/2009 |

(Continued)

OTHER PUBLICATIONS

China National Intellectual Property Administration, Office Action, CN Patent Application No. 201480045821.5, dated Jul. 3, 2019, 14 pages.

(Continued)

*Primary Examiner* — Phyllis A Book
(74) *Attorney, Agent, or Firm* — Fenwick & West LLP (57) ABSTRACT

The present invention relates to a system for automating processes, and in particular to a system for optimizing the distribution of work items among available processing resources within such a system. The system includes an active queue controller, executed on an application server that manages the creation and deletion of virtual machines on available resources while querying a data store for work items and instructions for executing that automated processes.

25 Claims, 3 Drawing Sheets

(56) References Cited

U.S. PATENT DOCUMENTS

| | | | |
|---|---|---|---|
| 9,292,466 B1 | 3/2016 | Vincent | |
| 10,469,572 B2 | 11/2019 | Moss et al. | |
| 2002/0147505 A1 | 10/2002 | Beck et al. | |
| 2004/0088717 A1 | 5/2004 | Chen et al. | |
| 2005/0138626 A1* | 6/2005 | Nagami | H04L 67/1002 718/105 |
| 2005/0149868 A1 | 7/2005 | Katayama et al. | |
| 2008/0163239 A1* | 7/2008 | Sugumar | G06F 9/5088 718/105 |
| 2010/0023517 A1 | 1/2010 | V. et al. | |
| 2010/0027896 A1 | 2/2010 | Geva et al. | |
| 2010/0257399 A1 | 10/2010 | Brown et al. | |
| 2011/0119388 A1* | 5/2011 | Attanasio | H04L 67/1002 709/227 |
| 2011/0289417 A1 | 11/2011 | Schaefer et al. | |
| 2012/0151063 A1* | 6/2012 | Yang | H04L 67/10 709/226 |
| 2012/0151480 A1 | 6/2012 | Diehl et al. | |
| 2012/0331342 A1* | 12/2012 | Behrendt | G06F 11/203 714/23 |
| 2013/0329023 A1 | 12/2013 | Suplee et al. | |
| 2014/0118239 A1 | 5/2014 | Phillips | |
| 2014/0181817 A1 | 6/2014 | Muller et al. | |
| 2014/0245115 A1 | 8/2014 | Zhang et al. | |
| 2014/0282978 A1 | 9/2014 | Lerner et al. | |
| 2015/0012919 A1 | 1/2015 | Moss et al. | |
| 2015/0106463 A1* | 4/2015 | Kruglick | H04L 51/14 709/206 |
| 2016/0266918 A1 | 9/2016 | Ge et al. | |
| 2018/0159721 A1 | 6/2018 | Delcheva et al. | |
| 2019/0014175 A1* | 1/2019 | Malachowski | H04L 67/2895 |

FOREIGN PATENT DOCUMENTS

| | | |
|---|---|---|
| JP | 2012-155219 A | 8/2012 |
| JP | 2013-041352 A | 2/2013 |

OTHER PUBLICATIONS

Communication pursuant to Article 94(3) EPC for European Patent Application No. EP 14741937.8, dated Jun. 30, 2017, 7 pages.
United States Office Action, U.S. Appl. No. 15/462,709, dated Feb. 8, 2019, 41 pages.
United States Office Action, U.S. Appl. No. 14/053,319, dated Jan. 23, 2020, 22 pages.
Japan Patent Office, Notice of Reasons for Refusal, JP Patent Application No. 2018-194709, dated Apr. 7, 2020, six pages.
United States Office Action, U.S. Appl. No. 14/053,319, dated Jul. 24, 2020, 25 pages.
United States Office Action, U.S. Appl. No. 16/583,208, dated Aug. 19, 2020, 60 pages.

\* cited by examiner

SYSTEM FOR OPTIMIZING DISTRIBUTION OF PROCESSING AN AUTOMATED PROCESS

CROSS REFERENCE TO RELATED APPLICATIONS

This application is a continuation of co-pending U.S. application Ser. No. 15/462,709, filed Mar. 17, 2017, which claims the right of priority to international application GB 1702450.6, filed Feb. 15, 2017, both of which are incorporated by reference in their entirety.

FIELD

The present invention relates to systems and methods for automating processes. More specifically, it relates to systems and methods for managing the execution of automated processes across one or more virtual workers.

BACKGROUND

It is often the case that expected, or unexpected, change requires a change in the way a business must operate. For example, the launch of a new product can require existing systems to be integrated, new regulation can require the recording of process steps or an acquisition can require the merging of two product lines and processes. Traditional enterprise system planning and rollout can absorb these issues; however, these planning cycles are designed for large projects, not supporting everyday operational change. As a result, changes are implemented at great cost and sometimes only over many years, as new systems replacing the functionality of the original systems and providing the required new functionality must be developed and require extensive testing and quality assurance before they can reliably be implemented. These systems must also be designed and configured by people with the required specialist skills in computer programming and application development. This adds more time to the development process since there are often relatively few people with the required skills, if any, within an organization and, once such systems are implemented, the time it takes for users of the original systems to become acquainted with the new systems can be long and the process is often characterized by inefficiency and inaccuracy.

The problem arises because back office business processes can often involve multiple independent and incompatible software applications. Some of these software applications may have APIs which facilitate the transfer of information in or out of an application by providing a predefined interface through which another software application may interact; however this is not always the case. For example, many of the software applications used in these back office business processes are old applications designed without the features required to allow easy access by other software applications. Others are custom in-house software solutions created to serve a very specific purpose where the need to provide an interface through which other applications could interact was not foreseen. Traditionally, this is overcome by using operational staff to bridge the gap between these software applications. The use of operational staff is an expensive solution, since large numbers of operational staff may need to be employed to provide the capacity required. Since the gap between these incompatible software applications or systems is bridged by a human, the process is typically slow since operational staff only work for part of the day, are limited by the speed at which they can input information or commands using a keyboard and mouse or any other interface and are limited by the speed at which they can read information from a screen or other output. Furthermore, humans are susceptible to errors in input of data or commands to a system and in reading information from another, which a computer is not. There also exists the possibility, when operational staff are used in such a manner, that malicious interference with processes, systems and data can occur.

For example, a telecoms provider may launch a new mobile phone handset which requires the use of existing software applications and new systems which may be incompatible. This shortfall is usually filled by operational staff, but often it is not possible to predict the demand for such newly launched products and so too many or too few staff are trained to use the software systems. It is, therefore, desirable to fill this gap between incompatible software systems with a solution which allows for rapid scaling to cope with demand, without requiring detailed knowledge of the demand up-front.

In such systems, large volumes of information, which may be sensitive personal information are often handled. It is also desirable to handle this information in a consistent manner which reduces the number of errors that may be associated with a human simply copying information from one system to another and it is also desirable to handle the information in a private and secure manner which is only accessible when absolutely necessary.

These problems, which require operational staff to fill in where pre-existing software applications fall short of the functionality required for a new process to be implemented, are not unique to the business back office. For example, the reception of a hospital or doctor's surgery is often a busy environment with many patients arriving for appointments. Receptionists spend a lot of time carrying out routine tasks such as taking details from patients arriving for appointments and inputting them into a software application which checks the patient in for their appointments. This process is often slow, can be inaccurate due to patient details being misheard and takes away the receptionists' time from carrying out other duties.

It may be desirable to provide self-service check-in kiosks in the reception of the hospital or doctor's surgery which enable patients arriving to input their own details to the system so that inaccuracies are minimized, receptionists are free to deal with other tasks and waiting times are reduced. However, to provide a patient with the same interface as that provided to the receptionist may not be appropriate, since the software applications used by the receptionist is likely to have more advanced features that are unnecessarily confusing to the patient or the application may have administrative controls or access to information that it would be inappropriate to provide to patients using a self-service check-in kiosk. Unless the existing receptionist application provides the capability for a new application which is run on the self-service kiosks to access certain functions and features, the same long planning cycles, expense, inefficiency and inaccuracy associated with change in back office business processes apply when new software applications and systems which provide the required functionality to implement these systems are developed. This often results in such projects never being undertaken. Many other such examples will be apparent to the reader.

Existing solutions involve the use of virtual machines as virtual workers that are configured to automate these processes by interacting with legacy software. Such a system is described in PCT application publication number WO 2015/001360 A1; however, these systems require a user to determine how work items should be distributed among the virtual workers, and this is often an inefficient way of determining such things. There is therefore a need for an appropriate system and method for optimizing the distribution of work items among the virtual workers.

SUMMARY

The present invention relates to a system for running automated processes. The system comprises a data store configured to store instructions for executing the automated processes, one or more work queues, and associations between each work queue and one of the automated processes; one or more virtual machines configured to execute one or more automated processes, wherein the automated processes are defined by instructions stored in the database; and an application server configured to assign one or more of the work queues to one or more of the virtual machines. Each virtual machine, when assigned a work queue by the application server, is configured to retrieve the instructions for executing the automated process associated with the assigned work queue from the database, and execute the automated process according to the instructions retrieved from the database.

Each work queue typically comprises one or more work items and each virtual machine is configured to execute the one or more automated processes by processing the work items of the assigned work queue according to the instructions stored in the database. Each work item may comprise one or more information data objects, and each work queue is typically a logical group of work items.

The instructions stored in the database may define a workflow for executing the automated process on each work item.

Preferably, the data store is further configured to store linking data which defines links between the one or more virtual machines and one or more work queues.

Each virtual machine may be further configured to communicate with one or more of the other virtual machines. The virtual machines may be configured to communicate with the one or more other virtual machines directly. Alternatively, the virtual machines may be configured to communicate by transmitting a message to one of the application server or the data store and the application server or data store may be configured to store the received message in a message repository, and each virtual machine may be configured to poll the application server or data store for messages in the message repository. Further alternatively, the virtual machines may be configured to communicate by transmitting a message to one of the application server or the data store, and the application server or data store may be configured to transmit the received messages to one or more of the virtual machines.

The application server may be configured to assign a single work queue to a plurality of virtual machines. The data store may therefore be configured to prevent simultaneous access to a given data object in the data store by the plurality of virtual machines by locking the given data object when a virtual machine accesses the given data object. Preferably, the lock on the given data object persists through-out a failover event, and the data store is configured to clear the lock by confirming that none of the virtual machines of the plurality of virtual machines is able to process the data object.

The application server may be configured to calculate a length of time required to process a work item before the work item is processed, based on localized environmental or performance issues, network connectivity, and responsiveness of the target virtual machine. The application server may configured to provide an estimated time to process a work queue based on the calculated length of time for processing a work item and the number of virtual machines to which the work queue is assigned.

The application server may also be configured to monitor the progress of work queue processing by the virtual machines. The application server may communicate with the one or more virtual machines using a messaging protocol, and each virtual machine may respond to the application server with status information during process execution.

The application server may be configured to provide recommendations on assigning work queues to additional virtual machines and/or on performance and throughput improvements.

Preferably, the application server is configured to assign work queues to virtual machines based on the resources available to each virtual machine.

The application server may be further configured to analyze the execution of the automated processes to identify an optimum distribution model based on the speed, success and/or responsiveness of each virtual machine, and to assign work queues to virtual machines based on the identified optimum distribution model. The application server may also instruct at least one of the virtual machines to stop processing the current work queue and begin processing a new work queue based on the optimum distribution model.

The application server may be configured to analyze the execution of the automated processes using machine learning algorithms to improve the distribution of work queues to virtual machines.

The application server may be configured to assign work queues to virtual machines based on attributes of the work items and/or work queues. The one or more work items may have a maximum queue time attribute that defines a maximum length of time that the work item can be part of the work queue before it is processed. The one or more work queues may have a maximum queue length attribute that defines a maximum number of work items that can be part of the work queue. At least one of the one or more work queues may have a queue completion time attribute that defines a maximum time by which all work items in the work queue are to be processed.

The application server may be configured to instruct at least one of the one or more virtual machines to stop processing the current work queue and begin processing a new work queue based on the attributes of the work items and/or work queues.

The system may further comprise an output device that is configured to output information relating to the current state and/or configuration of the system.

DETAILED DESCRIPTION

The systems and method described herein operate in the context of a system for automating processes by using virtual machines as a digital workforce that can interact with software applications and one another in order to execute the processes efficiently. Such a system is described in more detail in WO 2015/001360 A1, the disclosure of which is incorporated herein by reference.

Figure 1:
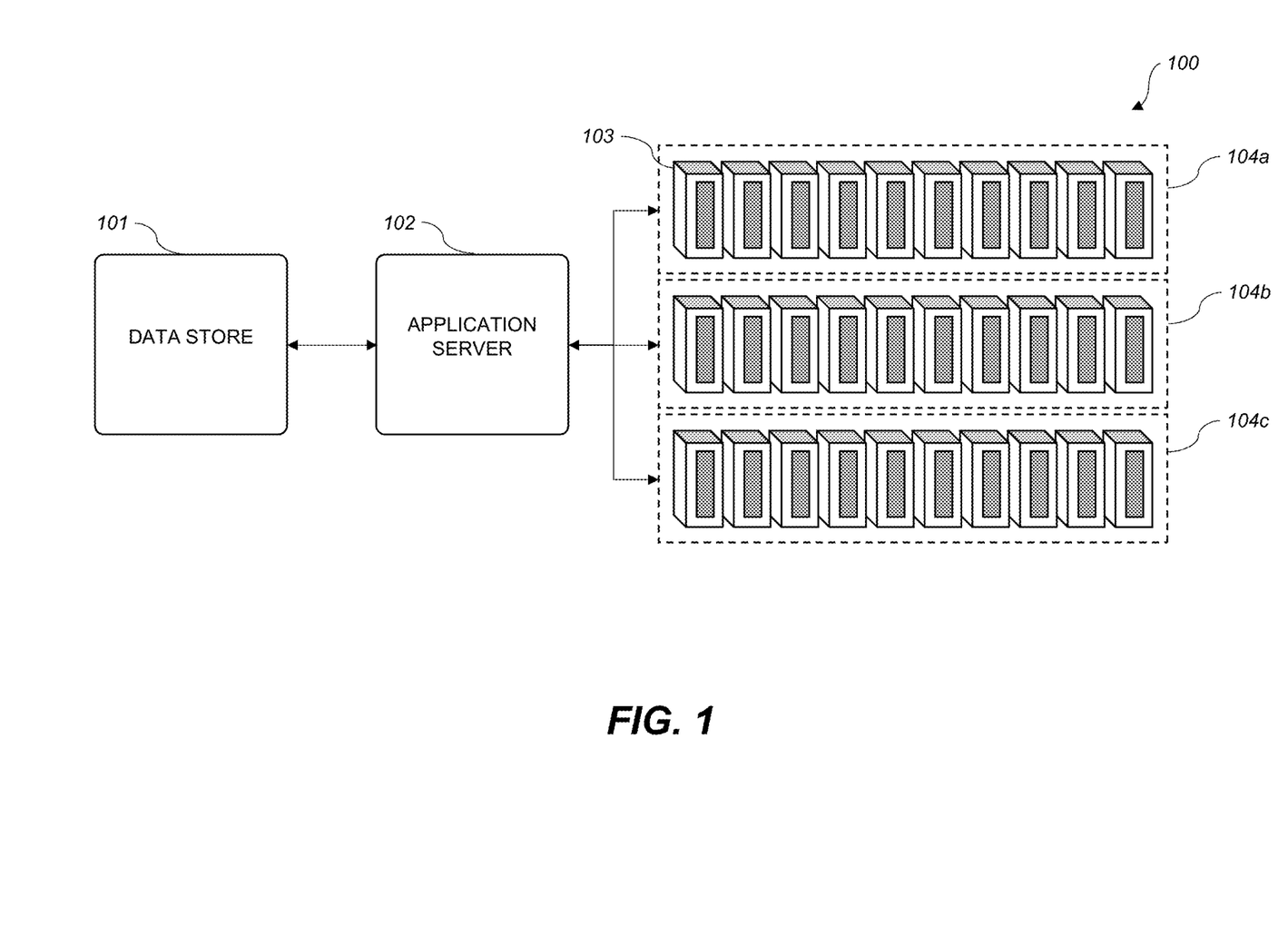
FIG. 1 is a schematic of an implementation of a system according to the present invention.

FIG. 1 depicts a typical system 100 according to the present invention. The system 100 includes a data store 101, an application server 102, and one or more virtual machines 103. The data store 101 stores data relevant to the automated processes, such as work items that are to be processed and the instructions that define the automated processes. The application server 102 mediates communication between the virtual machines 103 and the data store 101, and manages the creation, destruction and operation of the virtual machines 103. The virtual machines 103 are configured to carry out the automated processes according to instructions received from the application server 102.

The virtual machines 103 may be organized into one or more resource groups 104a-c. A resource group 104a-c may be a logical grouping of virtual machines that is implemented across one or more hardware devices, such as servers, and represents available computational capacity that is available to a given process or work queue to run virtual machines and thus the automated processes. A particular automated process might have access to a single resource group, or may have multiple resource groups made available to it. The data store 101 and application server 102 are typically provided on dedicated hardware resources such as dedicated servers; however, it will be appreciated that it is possible to operate the data store 101, application server 102 and virtual machines 103 on the same physical hardware.

The virtual machines 103 are persistent virtualized instances of standard end-user operating systems, preferably Microsoft Windows®, but any suitable operating system such as macOS® or a Linux distribution could also be used. Preferably, the virtual machines 103 exist on one or more secure servers which cannot be accessed, physically or remotely, without appropriate security clearance or authentication. The servers, or resources, on which the virtual machines exist preferably run Type 1 hypervisors such as VMware ESX®; however, it will be appreciated that any suitable arrangement of hardware and software permitting the creation and running of virtual machines may be used. The virtual machines 103 are typically headless in the sense that they do not have a connected monitor or similar output device which displays a graphical output. By running multiple virtual machines 103, multiple automated processes may be carried out simultaneously to improve productivity or serve multiple external users concurrently.

The automated processes that are executed by the virtual machines 103 generally involve interacting with legacy software applications either through the user-interface, using methods such as screen scraping, or by using any available APIs or accessibility interfaces. The work flows that define the automated processes are designed by a user, typically on a separate computer terminal, saved and stored on the application server 102 or data store 101.

In the embodiment depicted in FIG. 1, the data store 101 is in bi-directional communication with the application server 102, and the application server 102 is in bi-directional communication with the virtual machines 103. In this way, the application server acts as an intermediate device that manages the connections of the virtual machines 103 to the data store 101. The application server 102 holds the data store security credentials, such as for Windows Authentication or SQL Authentication, and behaves as a secure connection proxy for the data store 101 such that all of the virtual machines 103 communicate with the application server 102 and the application server 102 communicates securely with the data store 101 on behalf of the virtual machines 103. This arrangement allows the application server 102 to be the only entity within the system 100 which needs to store the data store security credentials with the correct authentication to access and modify the data stored on the data store 101. Since the database server security credentials are only stored in one place within the system 200, security is also improved with respect to the storage of security credentials on each virtual machine 103 and also provides improved security over multiple user multiple password systems. Of course, it will be appreciated that the systems and methods described herein may alternatively involve direct communication between the virtual machines 103 and the data store 101, or indirect communication via means other than the application server 102. Furthermore, the system 100 may include more than one application server 102. For example, the system 100 may include a dedicated application server for one or more resource groups 104a-c.

The data store 101 is preferably a SQL database. The data store 101 holds one or more SQL databases which hold a repository of processes and objects related to the automated processes, user credentials, audit information, process logs and workflow configuration and scheduling information for the automated processes. Multiple SQL schema can be present on one data store 101, permitting different virtual machines 103 to execute different automated processes referring to different sets of information stored within the database of the data store 101.

The data store 101 can be configured to prevent simultaneous access to a given data object in the data store by the virtual machines 103 by locking a data object when accessed by a virtual machine. When a virtual machine 103 accesses a data object in the data store 101, the virtual machine 103 also sends a request for the lock. Alternatively, the data store 101 may automatically lock the data object when it is accessed by the data object. The record locks present in the data store 101 persist through-out a failover event, e.g. power failure. The data store 101 clears the record locks by confirming that none of the virtual machines of the plurality of virtual machines 103 is able to process data in the database without re-requesting the lock. The virtual machines 103 may send a notification to the data store 101 that it no longer requires the lock on the data object, and the data store 101 subsequently removes the lock from the data object, allowing it to be accessed once again by other virtual machines 103.

The system 100 optimizes the execution of automated processes across the virtual machines 103 by utilizing work queues. In existing systems, the virtual machines 103 poll a work queue for work items to process. In the system of the present invention, work queues are assigned to virtual machines 103 by the application server 102, which uses target parameters and queue configuration information to determine how to achieve the target. This is described in more detail with respect to FIG. 2.

Figure 2:
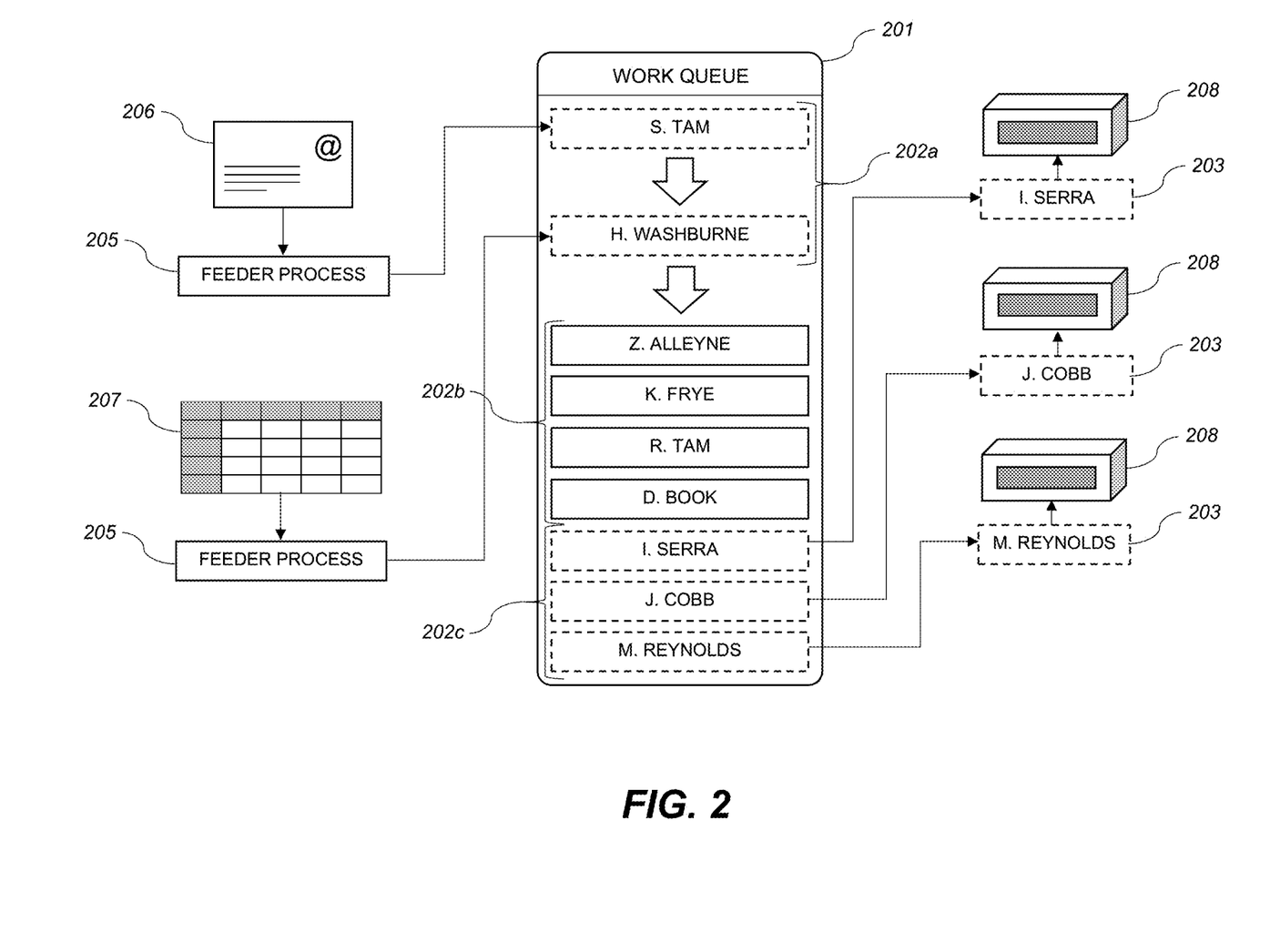
FIG. 2 shows an exemplary work queue and work items according to the present invention.

FIG. 2 shows a typical work queue 201, which is an ordered list of one or more work items 202a-c that are provided to virtual machines 103 for processing. Each work item 202a-c comprises one or more information data objects, such as a unique identifier for the work item, a case ID, and other contextual information. The specific types of information data objects for each work item 202a-c depend on the context and the automated process to which they relate. For example, in a process for activating SIM cards for use with a mobile phone network, the work items 202a-c may comprise a customer name, a telephone number, an ICCID, an IMSI and an authentication key.

The work queue is typically stored in the data store 101, but it will be appreciated that the work queue 201 may be stored at any suitable location in communication with the application server 102. The information data objects held by each work item 202a-c can be stored in plain text on the data store 101, or the work queue 201 can be configured to encrypt the information data objects automatically when they are saved to the queue, and decrypt them automatically when it is retrieved from the queue.

The work queue 201 can be populated with work items 202a-c manually, or through feeder processes 205. The feeder processes 205 can obtain data from any suitable source such as email 206, or a spreadsheet 207, output work items 202a in the appropriate format, and add the work items 202a to the work queue 201. The work queue 201 may operate on a first-in first-out (FIFO) basis, with work items 202c being distributed to the virtual machines 208 for processing.

Work items 202a-c can have metadata that is used to manage the automated processes (described in more detail with respect to FIG. 3), in addition to the information data objects that are used as part of the automated process. For example, the work items 202a-c may have a maximum queue time attribute that defines a maximum length of time that the work item 202a-c can be part of the work queue 201 before it is processed. The work queues 201 themselves can have a maximum queue length attribute that defines a maximum number of work items 202a-c that can be part of the work queue 201.

Figure 3:
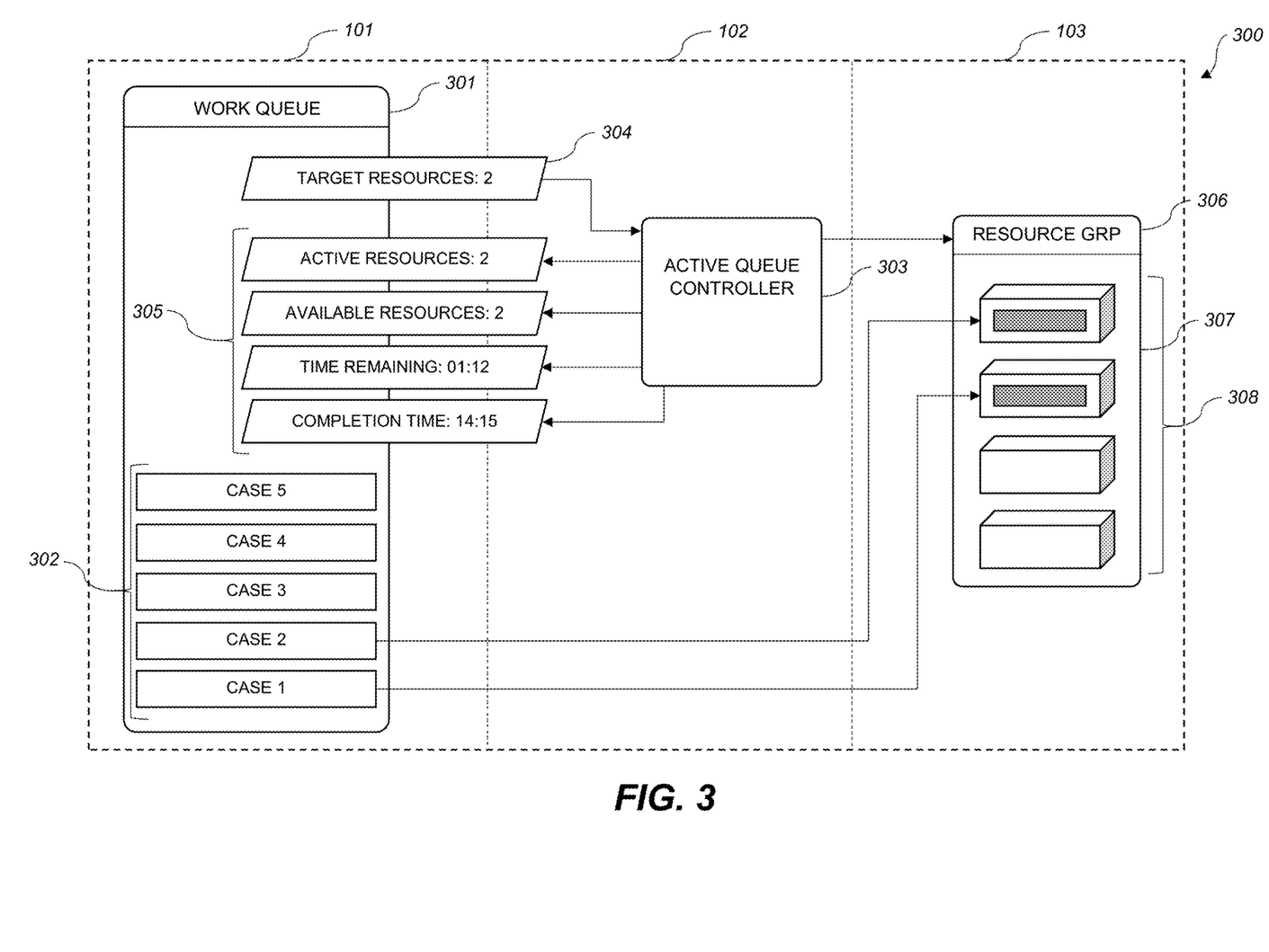
FIG. 3 is a logical diagram of the system of the present invention.

The manner in which the system of the present invention processes work queues is described in more detail with respect to FIG. 3. The system 300 includes the work queue 301, which is typically located on data store 101, and includes work items 302. The system 300 also includes an active queue controller 303, which is located on and executed by the application server 102. The active queue controller 303 is associated with the work queue 301. The active queue controller 303 manages the resources 308, e.g. in a resource group 306, by creating and destroying virtual machines 307 on the resources 308 and assigning the resources 308 and virtual machines 307 to its associated work queue 301. The active queue controller 303 also monitors the resources 308 and virtual machines 307 and queries the database store 101 for statistics relating to the work queue 301.

The work queue 301 may be associated with additional parameters 304 that determine how the active queue controller 303 manages the resource of resource group 306. In the example depicted in FIG. 3, "TARGET RESOURCES" parameter 304 defines a target number of resources 308 that the active queue controller should assign the work queue 301 to. This parameter 304 can be changed by a user of the system to add or remove resources that are working the queue, i.e. create or remove virtual machines 307 on the resources 308, for example in order to speed the process up, or to make more efficient use of resources for processes that are not time-sensitive.

The active queue controller 303 can provide feedback 305 to the user of the system. For example "ACTIVE RESOURCES" indicates the number of virtual machines 307 that are currently processing the work queue 301. "AVAILABLE RESOURCES" indicates the number of resources 308 that are available to run further virtual machines. "TIME REMAINING" gives an estimate of the total amount of time remaining to work all items 302 in the work queue 301. The estimated time required to process a single work item may be calculated based on localized environmental or performance issues, network connectivity, and responsiveness of the target virtual machine. The total estimated time remaining may be calculated by taking an average work time for a work item 302 in the queue 301 and multiplying by the number of items 302 remaining in the queue 302. "COMPLETION TIME" indicates the projected time at which the work queue 301 will be complete, i.e. the current time plus "TIME REMAINING". Other indications of the work queue 301 status and progress may in addition or instead be provided, such as whether the queue 301 is running or paused, the elapsed time, the number of completed work items 302, the number of pending work items 302, and/or a total number of cases in the work queue 301.

The active queue controller 303 is also responsible for creating and destroying virtual machines within the resource group 306. For a given automated process to execute, the active queue controller 306 finds available resources 308 within the resource group 306 and creates a virtual machine on the required resources 308.

When the active queue controller 303 determines that a new virtual machine must be created, e.g. to reach a new "TARGET RESOURCES", it creates and starts a new virtual machine on the available resources 308 in the resource group 306 assigned to its queue 301. The active queue controller 303 creates virtual machines on the least busy resource 308 first, e.g. if the group 306 has four available resources 308 and two of them already have running virtual machines, the active queue controller 303 will create a virtual machine on one of the resources that is not running any virtual machines. If any virtual machines fail to be created or started for some reason, it will retry on other resources.

If the active queue control 303 needs to destroy a virtual machine that is currently processing the work queue 301, the active queue controller 303 can send a stop request to a virtual machine 307, which causes the virtual machine 307 to cease processing items in the work queue once it has finished processing the current work item.

The virtual machines 307 retrieve work items 302 from the work queue 101 stored on the data store 101 via the application server 102. As the virtual machines 307 finish processing each work item 302, the virtual machines 307 retrieve new work items 302 from the work queue 301 stored on the data store 101 via the application server 102 until the work queue 101 is complete or until the active queue controller 303 instructs the virtual machines 307 to stop processing the work queue 301. Once told to stop processing one queue 301, the virtual machines 307 may be instructed to begin processing another work queue, and the virtual machines 307 themselves pull work items from the new work queue by communicating via the application server 102 with the data store 101.

The resources 308 and virtual machines 307 that are running are configured to communicate with other resources 308 and virtual machines 307. The virtual machines 307 may communicate with one another directly by transmitting and receiving direct messages between themselves. Alternatively, the virtual machines and resources may transmit and receive messages to one another via the application server 102. The application server 102 may simply redirect the messages it receives to the appropriate destination virtual machine 307, or the application server 102 may store the received messages in a repository that can be polled by virtual machines 307.

Communication between the virtual machines is particularly useful in two scenarios. Firstly, one of the virtual machines 307 can function as a management console such that a control terminal can display the status and availability or otherwise of the resources 308. The control terminal can be accessed by a user of the system to manually control the allocation of work queues to resources, to accept recommendations provided by the active queue controller 303, as described in more detail below, and/or to view the current state of the virtual machines 307, resources 308 and work queues 301.

Secondly, as an alternative to the resource groups being directly managed by the application server 102, as described above, one of the virtual machines 307 can function as the "head" of the resource group 306, and communicate with the other virtual machines 307 and resources 308 in the resource group to determine which virtual machines 307 and resources 308 are available for processing and to pass on instructions to the other members of the resource group to start and stop processing received from the application server 102.

The active queue controller 303 is configured to communicate asynchronously, or otherwise, with the virtual machines 307, i.e. during processing of a work item 302, in order to monitor the progress of the automated process. Thus, in addition to the statistics 305 that are provided to the user, the active queue controller 303 can provide recommendations to the user on assigning the work queue 301 to additional resources, i.e. creating new virtual machines 307 on resources 308, and on other performance improvements.

In order to provide these recommendations, the active queue controller 303 can analyze completion times and performance metrics on the virtual machines 307 in the infrastructure using completed work items which store the resource ID of the virtual machine 307, an ID of the process being executed, the date and time of the execution and the time taken to execute the process. Different virtual machines 307 may perform at different rates due to the capability of the underlying hardware, applications installed on the machine, including other virtual machines, and the distance of these applications and the machine itself from their respective application servers. The active queue controller 303 uses this data to calculate, for a given process, time of day and overall composition of work queue processing to be done, and which resources 308 or virtual machines 307 are best placed to perform the work in the optimum time.

As part of the monitoring of the virtual machines 307 and resources 308, the active queue controller 303 analyses the execution of the automated process to identify an optimum distribution model based on the speed, success and/or responsiveness of each virtual machine 307 and resource 308.

Each work queue 301 maintains historical data that provides a high-level view of the manner in which work items 302 have been processed. Each work item 302 that is worked also maintains a comprehensive log of activities in the data store 101 detailing the process steps that were taken to process the work item, which can vary from one case to another. The active queue controller 303 can use machine learning techniques to take the composition of the work queue 301 and resource information gathered by the active queue controller 303, as described above, and combine the data for that work item 302 and the detailed log files to build a model that correlates work queue data and log stages to determine which kind of work items take what particular periods of time to process. For example, a work item that relates to a current account with three account holders may take two times as long as a savings account with one account holder to process. The optimum distribution model is iteratively modified based on new data that is produced by the system as it processes the work queues according to the current optimum distribution model in order to improve the recommendations provided by the model. This information can only be gleaned over time using the depth of data accumulated within the data store 101 to learn the patterns of data and process that are reflected in the completion times, in addition to the process and resource information. The results of this analysis can subsequently be used to generate an optimum distribution model which describes the most effective way in which work items 302 within the work queue 301 should be distributed among the available resources 308 and virtual machines 307.

The active queue controller 303 may then provide one or more recommendations to the user on how the work items 302 should be distributed, or may automatically assign the work queue 301 and work items 302 to the optimal resource 308 based on the optimum distribution model. The active queue controller may take the maximum queue time of individual work items 302 and maximum queue length attributes of work queues 301 into account when distributing the work items 302 to individual virtual machines 307.

It will be appreciated that this description is by way of example only; alterations and modifications may be made to the described embodiment without departing from the scope of the invention as defined in the claims.

The following is a non-exhaustive list of embodiments of the subject matter that may be claimed in this application or in continuation or continuation-in-part applications:

Embodiment 1

A system for running automated processes comprising a data store configured to store instructions for executing the automated processes, one or more work queues, and associations between each work queue and one of the automated processes; one or more virtual machines configured to execute one or more automated processes, wherein the automated processes are defined by instructions stored in the database; and an application server configured to assign one or more of the work queues to one or more of the virtual machines, wherein each virtual machine, when assigned a work queue by the application server, is configured to: retrieve the instructions for executing the automated process associated with the assigned work queue from the database, and execute the automated process according to the instructions retrieved from the database.

Embodiment 2

The system of embodiment 1, wherein each work queue comprises one or more work items and each virtual machine is configured to execute the one or more automated processes by processing the work items of the assigned work queue according to the instructions stored in the database.

Embodiment 3

The system of embodiment 2, wherein each work item comprises one or more information data objects.

Embodiment 4

The system of any preceding embodiment, wherein each work queue is a logical group of work items.

Embodiment 5

The system of any preceding embodiment, wherein the instructions stored in the database define a workflow for executing the automated process on each work item.

Embodiment 6 system of any preceding embodiment, wherein the data store is further configured to store linking data which defines links between the one or more virtual machines and one or more work queues.

Embodiment 7

The system of any preceding embodiment, wherein each virtual machine is further configured to communicate with one or more of the other virtual machines.

Embodiment 8

The system of embodiment 7, wherein the virtual machines are configured to communicate with the one or more other virtual machines directly.

Embodiment 9

The system of embodiment 7, wherein the virtual machines are configured to communicate by transmitting a message to one of the application server or the data store, wherein the application server or data store is configured to store the received message in a message repository, and wherein each virtual machine is configured to poll the application server or data store for messages in the message repository.

Embodiment 10

The system of embodiment 7, wherein the virtual machines are configured to communicate by transmitting a message to one of the application server or the data store, and wherein the application server or data store is configured to transmit the received messages to one or more of the virtual machines.

Embodiment 11

The system of any preceding embodiment, wherein the application server is configured to assign a single work queue to a plurality of virtual machines.

Embodiment 12

The system of embodiment 10, wherein the data store is configured to prevent simultaneous access to a given data object in the data store by the plurality of virtual machines by locking the given data object when a virtual machine accesses the given data object.

Embodiment 13

The system of embodiment 12, wherein the lock on the given data object persists through-out a failover event.

Embodiment 14

The system of embodiment 13, wherein the data store is configured to clear the lock by confirming that none of the virtual machines of the plurality of virtual machines is able to process the data object.

Embodiment 15

The system of any preceding embodiment, wherein the application server is configured to calculate a length of time required to process a work item before the work item is processed.

Embodiment 16

The system of embodiment 15, wherein the application server is configured to calculate the length of time based on localized environmental or performance issues, network connectivity, and responsiveness of the target virtual machine.

Embodiment 17

The system of embodiment 15 or 16, wherein the application server is configured to provide an estimated time to process a work queue based on the calculated length of time for processing a work item and the number of virtual machines to which the work queue is assigned.

Embodiment 18

The system of any one of embodiments 15 to 17, wherein the application server is configured to monitor the progress of work queue processing by the virtual machines.

Embodiment 19

The system of embodiment 18, wherein the application server is configured to communicate with the one or more virtual machines using a messaging protocol, and wherein each virtual machine is configured to respond to the application server with status information during process execution.

Embodiment 20

The system of any one of embodiments 15 to 19, wherein the application server is configured to provide recommendations on assigning work queues to additional virtual machines and/or on performance and throughput improvements

Embodiment 21

The system of any preceding embodiment, wherein the application server is configured to assign work queues to virtual machines based on the resources available to each virtual machine.

Embodiment 22

The system of any preceding embodiment, wherein the application server is configured to analyze the execution of the automated processes to identify an optimum distribution model based on the speed, success and/or responsiveness of each virtual machine.

Embodiment 23

The system of embodiment 22, wherein the application server is configured to assign work queues to virtual machines based on the identified optimum distribution model.

Embodiment 24

The system of embodiment 22 or 23, wherein the application server is configured to instruct at least one of the virtual machines to stop processing the current work queue and begin processing a new work queue based on the optimum distribution model.

Embodiment 25

The system of embodiment 22, wherein the application server is configured to analyze the execution of the automated processes using machine learning algorithms to improve the distribution of work queues to virtual machines.

Embodiment 26

The system of embodiment 2, wherein the application server is configured to assign work queues to virtual machines based on attributes of the work items and/or work queues.

Embodiment 27

The system of embodiment 26, wherein at least one of the one or more work items has a maximum queue time attribute that defines a maximum length of time that the work item can be part of the work queue before it is processed.

Embodiment 28

The system of embodiment 26 or 27, wherein at least one of the one or more work queues has a maximum queue length attribute that defines a maximum number of work items that can be part of the work queue.

Embodiment 29

The system of any one of embodiments 26 to 28, wherein at least one of the one or more work queues has a queue completion time attribute that defines a maximum time by which all work items in the work queue are to be processed.

Embodiment 30

The system of any one of embodiments 26 to 29, wherein the application server is configured to instruct at least one of the one or more virtual machines to stop processing the current work queue and begin processing a new work queue based on the attributes of the work items and/or work queues.

Embodiment 31

The system of any preceding embodiments, wherein the system further comprises an output device that is configured to output information relating to the current state and/or configuration of the system.

What is claimed is:

1. A system for running automated processes comprising:
one or more hardware based servers in conjunction configured to host:
a data store configured to store instructions for executing the automated processes, one or more work queues, and associations between each work queue and one of the automated processes;
an application server configured to:
assign one or more of the work queues to one or more virtual machines,
calculate a length of time required to process a work item before the work item is processed, and
provide an estimated time to process a work queue based on the calculated length of time for processing a work item and the number of virtual machines to which the work queue is assigned; and
a virtual machine server running the one or more virtual machines, the one or more virtual machines configured to execute one or more automated processes, wherein the automated processes are defined by instructions stored in the data store, each virtual machine, when assigned a work queue by the application server, is configured to:
retrieve the instructions for executing the automated process associated with the assigned work queue from the data store, and
execute the automated process according to the instructions retrieved from the data store.

2. The system of claim 1, wherein each work queue comprises one or more work items and each virtual machine is configured to execute the one or more automated processes by processing the work items of the assigned work queue according to the instructions stored in the data store.

3. The system of claim 2, wherein the application server is configured to assign work queues to virtual machines based on one or more attributes of the work items and/or work queues, the attributes are selected from the group consisting of:
a maximum queue time attribute that defines a maximum length of time that the work item can be part of the work queue before it is processed;
a maximum queue length attribute that defines a maximum number of work items that can be part of the work queue;
a queue completion time attribute that defines a maximum time by which all work items in the work queue are to be processed.

4. The system of claim 3, wherein the application server is configured to instruct at least one of the one or more virtual machines to stop processing the current work queue and begin processing a new work queue based on the attributes of the work items and/or work queues.

5. The system of claim 1, wherein each work queue is a logical group of work items.

6. The system of claim 1, wherein the instructions stored in the data store define a workflow for executing the automated process on each work item.

7. The system of claim 1, wherein the data store is further configured to store linking data which defines links between the one or more virtual machines and one or more work queues.

8. The system of claim 1, wherein the virtual machines are configured to communicate with one or more other virtual machines by transmitting a message to one of the application server or the data store, wherein the application server or data store is configured to store the received message in a message repository, and wherein each virtual machine is configured to poll the application server or data store for messages in the message repository.

9. The system of claim 1, wherein the virtual machines are configured to communicate with one or more other virtual machines by transmitting a message to one of the application server or the data store, and wherein the application server or data store is configured to transmit the received messages to one or more of the virtual machines.

10. The system of claim 9, wherein the data store is configured to prevent simultaneous access to a given data object in the data store by the plurality of virtual machines by locking the given data object when a virtual machine accesses the given data object.

11. The system of claim 10, wherein the lock on the given data object persists through-out a failover event.

12. The system of claim 11, wherein the data store is configured to clear the lock by confirming that none of the virtual machines of the plurality of virtual machines is able to process the data object.

13. The system of claim 1, wherein the application server is configured to calculate the length of time based on localized environmental or performance issues, network connectivity, and responsiveness of the target virtual machine.

14. The system of claim 1, wherein the application server is configured to monitor the progress of work queue processing by the virtual machines.

15. The system of claim 14, wherein the application server is configured to communicate with the one or more virtual machines using a messaging protocol, and wherein each virtual machine is configured to respond to the application server with status information during process execution.

16. The system of claim 1, wherein the application server is configured to provide recommendations on assigning work queues to additional virtual machines and/or on performance and throughput improvements.

17. The system of claim 1, wherein the application server is configured to assign work queues to virtual machines based on the resources available to each virtual machine.

18. The system of claim 1, wherein the application server is configured to analyze the execution of the automated processes to identify an optimum distribution model based on the speed, success and/or responsiveness of each virtual machine.

19. The system of claim 18, wherein the application server is configured to assign work queues to virtual machines based on the identified optimum distribution model.

20. The system of claim 18, wherein the application server is configured to instruct at least one of the virtual machines to stop processing the current work queue and begin processing a new work queue based on the optimum distribution model.

21. The system of claim 18, wherein the application server is configured to analyze the execution of the automated processes using machine learning algorithms.

22. The system of claim 1, wherein the system further comprises an output device that is configured to output information relating to the current state and/or configuration of the system.

23. The system of claim 1, wherein the one or more hardware based servers includes a first hardware based server; wherein the first hardware based server is configured to host the data store, the application server and the virtual machine server.

24. The system of claim 1, wherein the one or more hardware based servers include a first hardware based server and a second hardware based server; wherein the first hardware based server is configured to host at least two of the data store, the application server and the virtual machine server.

25. The system of claim 1, wherein the one or more hardware based servers include a first hardware based server, a second hardware based server, and a third hardware based server; wherein each of the first, second and third hardware based server is configured to host one of the data store, the application server and the virtual machine server.

* * * * *